(12) United States Patent
Walker et al.

(10) Patent No.: US 12,095,715 B2
(45) Date of Patent: Sep. 17, 2024

(54) VALIDATING AND PROVIDING ACCESSIBLE ELECTRONIC MESSAGES

(71) Applicant: Microsoft Technology Licensing, LLC, Redmond, WA (US)

(72) Inventors: Christopher Dee Elvoid Walker, Bothell, WA (US); Peter Frem, Bothell, WA (US); Vandana Gummuluru, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/642,364

(22) PCT Filed: Sep. 10, 2020

(86) PCT No.: PCT/US2020/050248
§ 371 (c)(1),
(2) Date: Mar. 11, 2022

(87) PCT Pub. No.: WO2021/050766
PCT Pub. Date: Mar. 18, 2021

(65) Prior Publication Data
US 2022/0329551 A1 Oct. 13, 2022

(30) Foreign Application Priority Data
Sep. 11, 2019 (NL) .................... 2023811

(51) Int. Cl.
*H04L 51/066* (2022.01)
*H04L 51/063* (2022.01)
*H04L 51/21* (2022.01)

(52) U.S. Cl.
CPC .......... *H04L 51/066* (2013.01); *H04L 51/063* (2013.01); *H04L 51/21* (2022.05)

(58) Field of Classification Search
CPC ...... H04L 51/066; H04L 51/063; H04L 51/21
See application file for complete search history.

(56) References Cited

U.S. PATENT DOCUMENTS

| 7,058,586 B1 | 6/2006 | Law |
| 7,093,029 B2 | 8/2006 | Brown et al. |

(Continued)

FOREIGN PATENT DOCUMENTS

| CN | 101681492 A | 3/2010 |
| CN | 102930424 A | 2/2013 |

(Continued)

OTHER PUBLICATIONS

Microsoft 365. (Jul. 17, 2018). How to check spelling, grammar, and clarity with Microsoft word 2016. YouTube. https://www.youtube.com/watch?v=YZ2VUV6dSuM (Year: 2018).*
"Improve accessibility with the Accessibility Checker", Retrieved From: http://web.archive.org/web/20201125203529/https://support.microsoft.com/en-gb/office/improve-accessibility-with-the-accessibility-checker-a16f6de0-2f39-4a2b-8bd8-5ad801426c7f?ui=en-us&rs=en-gb&ad=GB, Nov. 25, 2020, 8 Pages.

(Continued)

*Primary Examiner* — Austin J Moreau
(74) *Attorney, Agent, or Firm* — Ray, Quinney & Nebeker; James S. Bullough

(57) ABSTRACT

The present disclosure relates to systems, methods, and computer-readable media for selectively analyzing content of electronic communications and enabling a sender to modify content to comply with one or more accessibility preferences. For example, systems disclosed herein may enable a client device to selectively analyze portions of an electronic communication and provide an accessibility alert indicator that one or more accessibility violations exist for a corresponding set of recipients. In addition, systems disclosed herein involve selectively applying a dynamic set of accessibility rules to content of the electronic document based on recipients that are added or removed as well as content of the electronic communication as it is composed.

19 Claims, 12 Drawing Sheets

(56) References Cited

U.S. PATENT DOCUMENTS

| | | | |
|---|---|---|---|
| 8,166,119 B2 | 4/2012 | Ligh et al. | |
| 9,747,275 B1 | 8/2017 | Barsness et al. | |
| 2007/0041370 A1 | 2/2007 | Cleveland | |
| 2007/0213077 A1 | 9/2007 | Mian et al. | |
| 2008/0162042 A1* | 7/2008 | Huber | G01C 21/343 |
| | | | 701/431 |
| 2009/0150920 A1* | 6/2009 | Jones | H04N 21/4788 |
| | | | 725/23 |
| 2014/0330915 A1 | 11/2014 | Murphy et al. | |
| 2014/0351796 A1* | 11/2014 | Gur-esh | G06F 11/3644 |
| | | | 717/126 |
| 2017/0220536 A1* | 8/2017 | Chiba | G06F 40/232 |
| 2017/0265277 A1* | 9/2017 | Nolan | H05B 47/125 |
| 2018/0167488 A1* | 6/2018 | Cadiz | H04L 51/066 |
| 2020/0372205 A1* | 11/2020 | Bradley | G06F 40/134 |

FOREIGN PATENT DOCUMENTS

| | | |
|---|---|---|
| CN | 105164663 A | 12/2015 |
| KR | 20180020391 A * | 2/2018 |

OTHER PUBLICATIONS

"Project Idea | Voice Based Email for Visually Challenged", Retrieved From: https://web.archive.org/web/20171204221920/http:/www.geeksforgeeks.org/project-idea-voice-based-email-visually-challenged/, Dec. 4, 2017, 9 Pages.

"Search Report Issued In Netherlands Patent Application No. N2023811", Mailed Date: Apr. 10, 2020, 10 Pages.

"International Search Report and Written Opinion Issued in PCT Application No. PCT/US20/050248", Mailed Date: Dec. 4, 2020, 13 Pages.

"First Office Action Issued in Chinese Patent Application No. 202080063965.9", Mailed Date: Feb. 4, 2023, 34 Pages.

"Office Action Issued in Chinese Patent Application No. 202080063965.9", Mailed Date: Jul. 29, 2023, 32 Pages.

Office Action Received for Chinese Application No. 202080063965.9, mailed on Nov. 30, 2023, 34 pages (English Translation Provided).

Communication pursuant to Articie 94(3) Received for European Application No. 20775785.7, mailed Jul. 1, 2024, 5 pages.

* cited by examiner

VALIDATING AND PROVIDING ACCESSIBLE ELECTRONIC MESSAGES

CROSS REFERENCE TO RELATED APPLICATIONS

This application is a U.S. Nationalization of PCT Application Number PCT/US2020/050248, filed on Sep. 10, 2020, which claims benefit and priority to Netherlands Application Number 2023811, filed on Sep. 11, 2019, the entirety-entireties of which are incorporated herein by reference.

BACKGROUND

Recent years have seen a significant rise in the use of computing devices (e.g., mobile devices, personal computers, server devices) to perform a variety of different tasks. Indeed, as computing devices continue to gain popularity, more and more individuals are communicating by way of computing devices. With this increase in popularity of computing devices and a wider variety of applications, ensuring accessibility to digital content continues to be a concern. For example, digital communication systems, such as electronic messaging systems (e.g., email, texting, instant messaging systems), social networking systems, and collaboration systems allow users to compose content as well as attach, link, share, transmit, or otherwise communicate content between any number of communication devices.

While these systems provide useful tools that enable users to communicate with other users in efficient and convenient ways, many individuals are unable to consume a significant portion of the content that is often communicated. For example, many individuals have disabilities or various accessibility limitations that limit their ability to effectively consume some types of content that are communicated between computing devices. As a result, many individuals are unable to consume content received at respective computing devices.

Moreover, even where various applications and communication systems include features and functionality for communicating accessible content (e.g., content that satisfies defined accessibility criteria), many communications are sent that include non-accessible content (e.g., content that fails to comply with accessibility criteria). For example, sharers and/or creators of digital content may not know what accessibility constraints are relevant to a particular audience. Moreover, senders of digital content may not know what actions are needed to modify non-accessible content to satisfy accessibility preferences of various recipients. In addition, complying with every possible accessibility preference may be inconvenient or computationally prohibitive, particularly where a limited number of accessibly preferences are applicable to a set of recipients or where a sender may not have a reliable connection or ready access to a server with accessibility preference information thereon.

These and other problems exist with regard to providing accessible content to any number of recipients.

DETAILED DESCRIPTION

Figure 1:
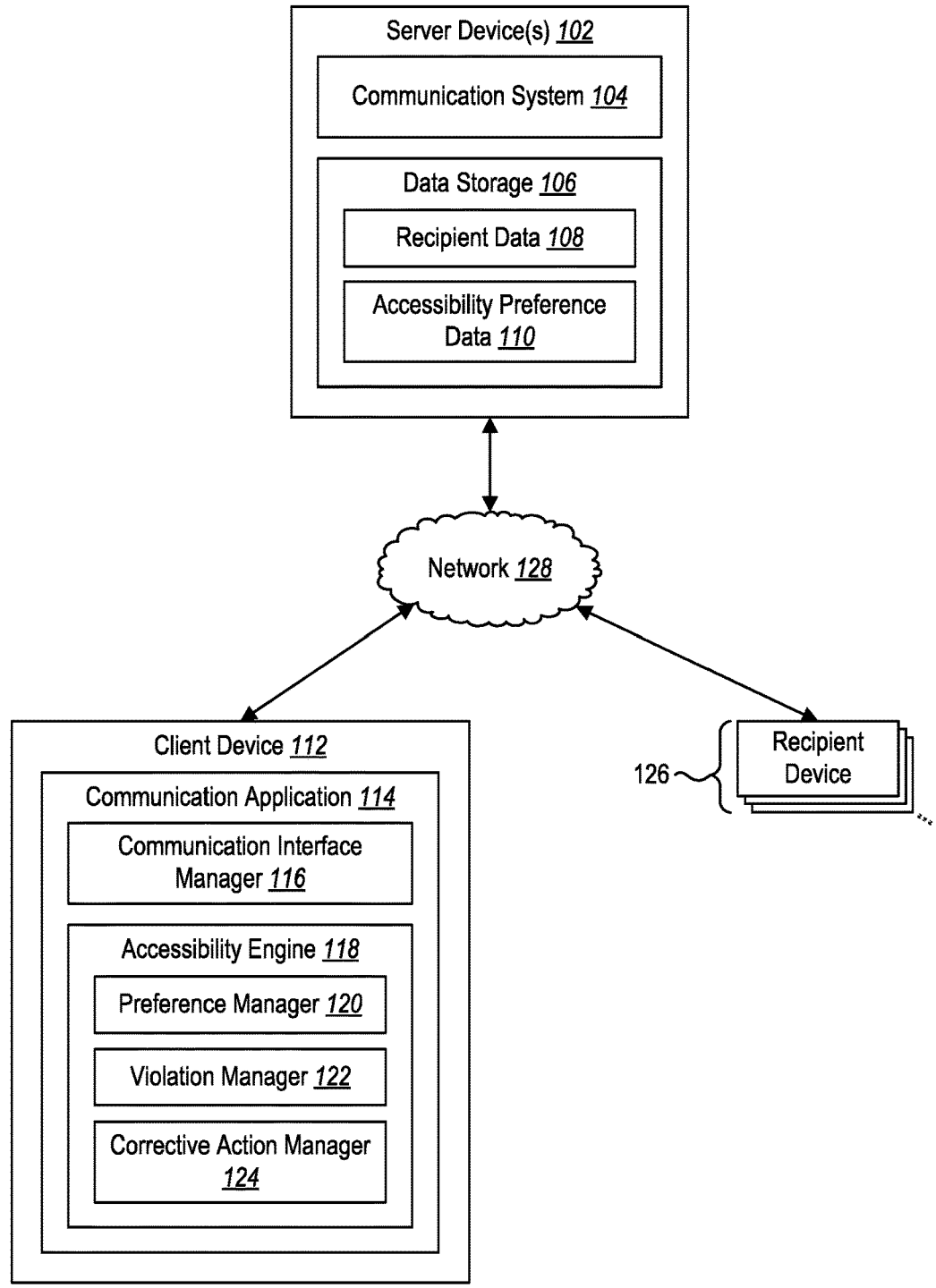
FIG. 1 illustrates an example environment of a system that enables a client device to provide accessible content to one or more recipient devices in accordance with one or more embodiments.

The present disclosure is related to a system that facilitates providing accessible content of an electronic communication to one or more recipients of the electronic communication. In particular, as will be discussed in further detail below, a communication application (e.g., an email client or other communication program) may identify one or more recipient (e.g., intended recipients) of an electronic communication. Based on the identified recipient(s), the communication application may identify whether one or more accessibility preferences apply to the electronic communication. Based on the accessibility preference(s), the communication application can apply a set of one or more rules to content of the electronic message to determine whether one or more accessibility violations exist. Where an accessibility violation is detected, the communication application can provide an accessibility alert indicator indicating that the content of the electronic communication has at least one accessibility violation present.

The present disclosure includes a number of practical applications and features that provide benefits and/or solve problems associated with delivering electronic communications whose content complies with one or more accessibility preferences that are applicable to a set of recipients. For example, upon identifying a set of recipients of an electronic communication, the communication application can selectively identify those accessibility preferences and associated accessibility rules that should be applied to the electronic message. In particular, the communication application can compile or generate a list of only those accessibility preferences and associated accessibility rules (e.g., a subset of accessibility preferences and associated rules) from a collection of all possible accessibility preferences that should be selectively applied to electronic content. In this way, the communication application may selectively apply accessibility rules to content of an electronic message rather than applying an overly inclusive and/or computationally expensive analysis of all content within any electronic messages for which accessibility preferences have been identified.

In one or more embodiments, the communication application can further update the accessibility references as one or more additional recipients are added or, alternatively, as one or more recipients are removed from a list of recipients. By dynamically compiling and updating a relevant set of accessibility preferences based on a current set of recipients, the communication application can provide flexibility in applying accessibility rules to an electronic communication even where a user does not immediately identify all recipients of the electronic communication.

In addition, as will be discussed in further detail below, in one or more embodiments, the communication application provides an accessibility alert indicator in response to identifying a first accessibility violation within an electronic communication. Indeed, in one or more embodiments described herein, upon providing the accessibility alert indicator, the communication application may stop applying accessibility rules to the electronic document while a sender continues to compose the document. Rather, the communication application may wait until a sender selects the accessibility alert indicator to apply a current set of accessibility rules to remaining content of the electronic communication. In this way, the communication application may indicate that the electronic communication has one or more accessibility violations that a sender may select at any time rather than interrupting a sender while composing a body of the electronic communication.

As will be further discussed, the communication application may perform a variety of actions based on different types of accessibility violations. For example, where an accessibility violation has an associated corrective action, the communication application can automatically modify the electronic communication in conjunction with providing the accessibility alert indicator. As a further example, the communication application may provide one or more recommendations of actions to perform to comply with accessibility preferences in conjunction with providing the accessibility alert indicator. In addition, the communication application can simply provide a reason for the accessibility alert indicator (e.g., a description of the non-compliance or a rule that is violated) and allow a sender to manually modify the electronic communication. In one or more embodiments, the communication application may utilize third-party tools and/or models (e.g., machine learning models) trained to identify or perform corrective actions to different types of content to comply with various accessibility preferences.

As illustrated in the foregoing discussion, the present disclosure utilizes a variety of terms to describe features and advantages of the systems described herein. Additional detail is now provided regarding the meaning of some of these terms. As used herein, an "electronic communication" may refer to any digital content delivered from a first device to another device (e.g., from a sender to one or more recipients). Examples of electronic communications may include emails, text messages, instant messages, social networking posts, or other communication created by an individual using an electronic device and shared, transmitted, or otherwise provided to one or multiple recipients. An electronic communication may include a body of the communication, which may refer to a portion of a communication composed or otherwise created by a sender. An electronic communication may further include one or more attachments and/or linked files (e.g., images, videos, documents) that are delivered in conjunction with the electronic communication. For instance, an electronic communication may include a downloadable document or other digital content accessible via a link (e.g., a universal resource locator (URL)) included within the electronic communication.

As used herein, an "accessibility preference" may refer to any setting or indicator that an individual has selected to indicate a desire to receive digital content that complies with one or more associated rules (e.g., accessibility rules). For instance, an accessibility preference may indicate a preference that specific types of content (e.g., images, videos) should not be included within an electronic communication. As a further example, an accessibility preference may indicate that specific types of content (e.g., images, videos) should include supplemental data that enables a recipient to consume that content (e.g., a text description or caption of an image and/or video). As yet another example, an accessibility preference may include a preference that certain contrast ratios (e.g., pixel ratios) and/or colors should not be used within a message. In one or more embodiments, accessibility preferences may indicate conventional accessibility standards or guidelines, such as web content accessibility guidelines (WCAG) or other accessibility standards.

Accessibility preferences may further be targeted toward specific portions of an electronic communication. For instance, an accessibility preference may be indicated as applicable to a body of a communication (e.g., a composed portion of an email) while not applicable against one or more attached documents or linked documents (e.g., webpages) referenced by the electronic communication. Alternatively, accessibility preferences may include any content of an electronic communication including a composed body of the communication, any attached documents or files, and/or any document, webpage, or other digital content referenced to or made accessible via the electronic communication.

As mentioned above, an accessibility preference may be associated with one or more accessibility rules. Accessibility rules may refer to logic or instructions that, when applied to content of an electronic communication, provide an indication of whether the electronic content complies with a corresponding accessibility preference or whether the content of the electronic communication includes one or more violations of the indicated preferences. A single accessibility preference may include a set of multiple accessibility rules. Moreover, one or more accessibility rules may correspond to different accessibility preference. As will be discussed in further detail below, one or more accessibility preferences may be inclusive of other accessibility preferences rendering the other accessibility preferences redundant. For example, a first accessibility preference may be associated with a first set of accessibility rules that are redundant or inclusive of a second accessibility preference associated with a second set of accessibility rules that are a proper subset of the first set of accessibility rules.

Additional detail will now be provided regarding systems and methods described herein in relation to illustrative figures portraying example implementations. For example, FIG. 1 illustrates an example environment 100 including devices and components for generating and providing electronic communications that selectively comply with accessibility preferences of one or more indicated recipients. As shown in FIG. 1, the environment 100 includes one or more server device(s) 102 including a communication system 104 implemented thereon and a data storage 106 that provides access to recipient data 108 and accessibility preference data 110 to the communication system 104.

As further shown, the environment 100 includes a client device 112 having a communication application 114 implemented thereon. The communication application 114 may refer to any communication-based application such an email client, messaging client, or any software program associated with the communication system 104 on the server device(s)

102. As shown in FIG. 1, the communication application 114 may include a communication interface manager 116 and an accessibility engine 118. The accessibility engine 118 may include a preference manager 120, a violation manager 122 and a corrective action manager 124 implemented thereon. In one or more embodiments, the client device 112 refers to a sender device from which an electronic communication originates. As further shown, the environment 100 may include a set of recipient devices 126.

As shown in FIG. 1, the server device(s) 102, client device 112, and recipient devices 126 may communicate with one another directly or indirectly through a network 128. The network 128 may include one or multiple networks and may use one or more communication platforms or technologies suitable for transmitting data. The network 128 may refer to any data link that enables transport of electronic data between devices and/or modules of the environment 100. The network 128 may refer to a hardwired network, a wireless network, or a combination of a hardwired and a wireless network. In one or more embodiments, the network 128 includes the Internet.

The client device 112 and recipient devices 126 may refer to various types of computing devices. For example, the client device 112 (and/or recipient devices 126) may be a mobile device such as a mobile telephone, a smart phone, a personal digital assistant (PDA), a tablet, or a laptop. Additionally, or alternatively, the devices 112, 126 may refer to one or more non-mobile devices such as a desktop computer, server device, or other non-portable device. In one or more implementations, one or more of the devices 112, 126 may be communicatively coupled (e.g., wired or wirelessly) to a display device having a graphical user interface thereon for providing a display of content. The server device(s) 102 may similarly refer to various types of computing devices. Each of the devices of the environment 100 may include features and functionality described below in connection with FIG. 8.

As mentioned above, and as shown in FIG. 1, the communication application 114 may refer to an email client or application (e.g., a web browser) that enables a user of the client device 112 to generate and deliver electronic communications from the client device 112 to any number of recipient devices 126. While one or more examples described herein may relate specifically to composing and delivering an email or similar type of communication, it will be understood that features and functionality in connection with generating and delivering emails, text messages, or other similar types of communications in compliance with accessibility preferences, these examples are not intended to be limited to specific formats of communications, and may be applicable to any type of electronic communication.

As discussed above, the communication application 114 may include a communication interface manager 116. The communication interface manager 116 may provide a graphical user interface of the communication application 114 that enables a user of the client device 112 to interact with and prepare an electronic communication for delivery to one or more recipients. For example, the communication interface manager 116 may provide interactive elements that enable a user to add and remove recipients from a list of intended recipients. The communication interface manager 116 may additionally provide a body within which a user may compose and format text and add or remove digital content items (e.g., images, videos, documents). The communication interface manager 116 may additionally provide interactive elements to enable the user of the client device 112 to attach documents and other files as well as provide links within the electronic document that provide access to data storages and/or other documents (e.g., webpages, shared files).

As will be discussed in further detail below, the communication interface manager 116 may provide one or more interactive elements that enable a user to view accessibility violations and perform one or more actions to bring the electronic communication in compliance with accessibility preferences. For example, the communication interface manager 116 can provide an accessibility alert indicator indicating whether one or more violations have been detected. The communication interface manager 116 can additionally provide a selectable option to evaluate some or all content of the electronic communication to identify any number of accessibility violations that exist within the electronic communication. Moreover, the communication interface manager 116 can provide a pane or display of any number of detected accessibility violations and associated corrective actions that have been performed or may be performed to bring the electronic communication in compliance with accessibility preferences.

As further shown, the communication application 114 may include an accessibility engine 118 for performing various actions in accordance with one or more embodiments described herein. For example, the accessibility engine 118 may include a preference manager 120 for identifying accessibility preferences that are applicable to an electronic communication. For instance, the preference manager 120 can identify a set of accessibility preferences based on detecting that one or more recipients have indicated a preference to receive accessible content.

In one or more embodiments, the preference manager 120 identifies a set of accessibility preferences by providing a call to the communication system 104 for recipient data 108 and accessibility preference data 110. For example, the preference manager 120 may provide an identification of a plurality of recipients and receive an identification of those recipients that have requested accessible content. The preference manager 120 may further receive an indication of a set of accessibility preferences and associated accessible rules to apply to content of the electronic communication prior to delivering the electronic communication.

In one or more embodiments, the preference manager 120 identifies or otherwise assigns a default accessibility preference for each user (e.g., sender or recipient) associated with a set of accessibility preferences that should apply to each electronic communication. For example, where a user does not specifically identify that an accessibility preference should apply, the preference manager 120 can assign a default setting that accessibility preferences apply to the recipient. In addition, a sender may similarly have a default setting that outgoing messages should satisfy accessibility criteria associated with a set of default accessibility preferences. In accordance with one or more embodiments described herein, the communication application 114 may identify and selectively enforce accessibility preferences based on one or more default settings applicable to recipients and/or senders of electronic communications.

The accessibility engine 118 may further include a violation manager 122 for implementing a set of accessibility rules associated with an identified set of recipients. For example, the violation manager 122 can apply a set of accessibility rules to content of the electronic communication upon receiving a command from a user of the client device 112 to determine whether the electronic communication includes any accessibility violations. In one or more embodiments, the violation manager 122 applies one or more accessibility rules to the electronic communication as new content is composed (e.g., as a user composes or adds text to a body of the electronic communication). In one or more implementations, the violation manager 122 applies accessibility rules to the document until identifying a first violation and waits to receive additional instruction from the user of the client device 112 before performing additional analysis of additional content (e.g., additional composed content, attachments, linked content) of the electronic communication.

As further shown, the accessibility engine 118 may include a corrective action manager 124. The corrective action manager 124 may perform a variety of corrective actions associated with modifying content of the electronic communication to enable the electronic communication to comply with various accessibility preferences. For example, in one or more embodiments, the corrective action manager 124 automatically modifies content to to correct one or more detected accessibility violations. In one or more embodiments, the corrective action manager 124 provides recommendations including one or more recommended actions and/or selectable elements that facilitate modifying content of the electronic communication. In one or more embodiments, the corrective action manager 124 simply provides an indication of any accessibility violations including a description of the violation and/or accessibility preference to enable a user of the client device 112 to manually modify the electronic communication to comply with the accessibility preference(s).

Figure 2:
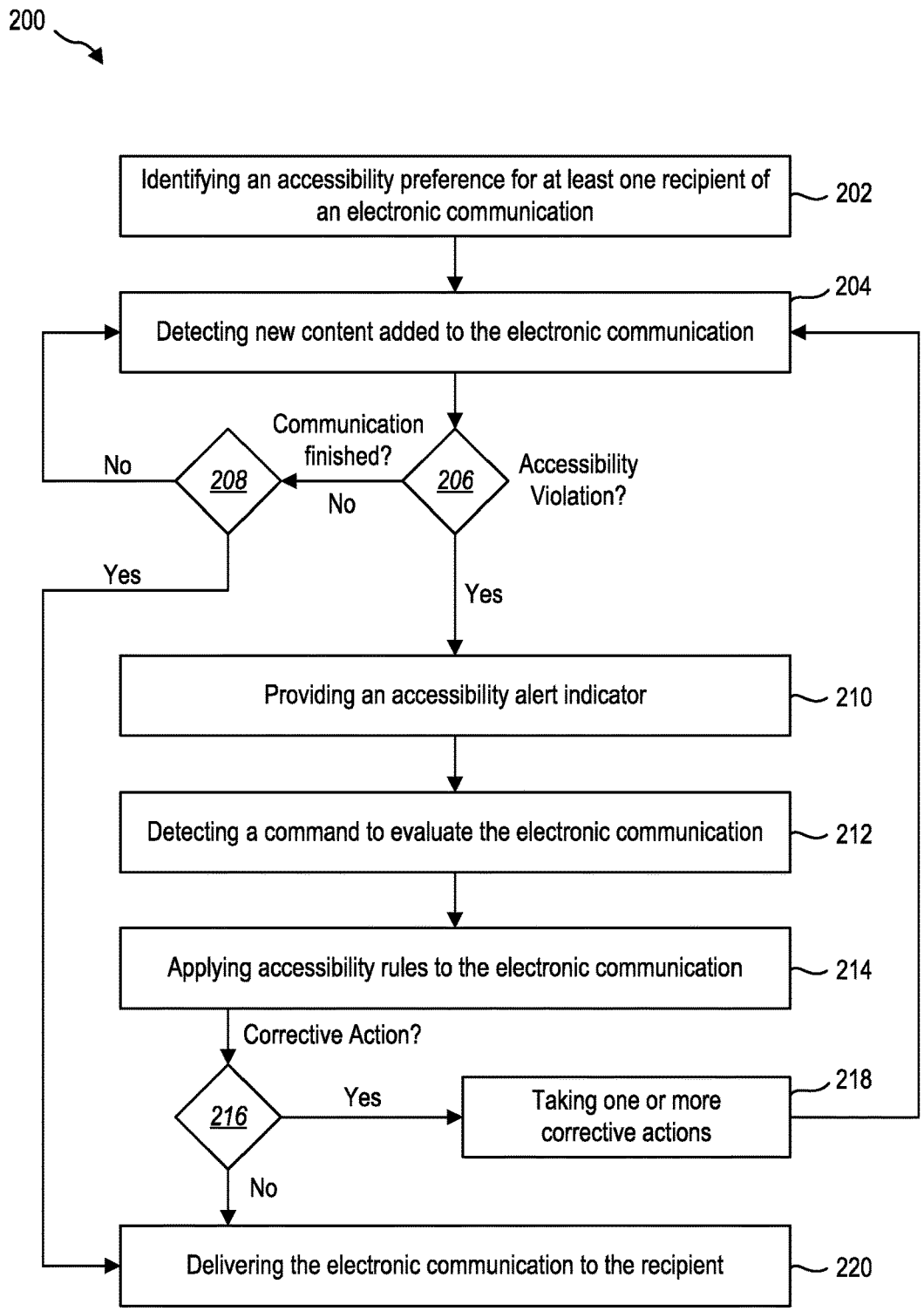
FIG. 2 illustrates an example series of acts for determining whether to apply one or more accessibility rules to content of an electronic message in accordance with one or more embodiments.
Figure 3:
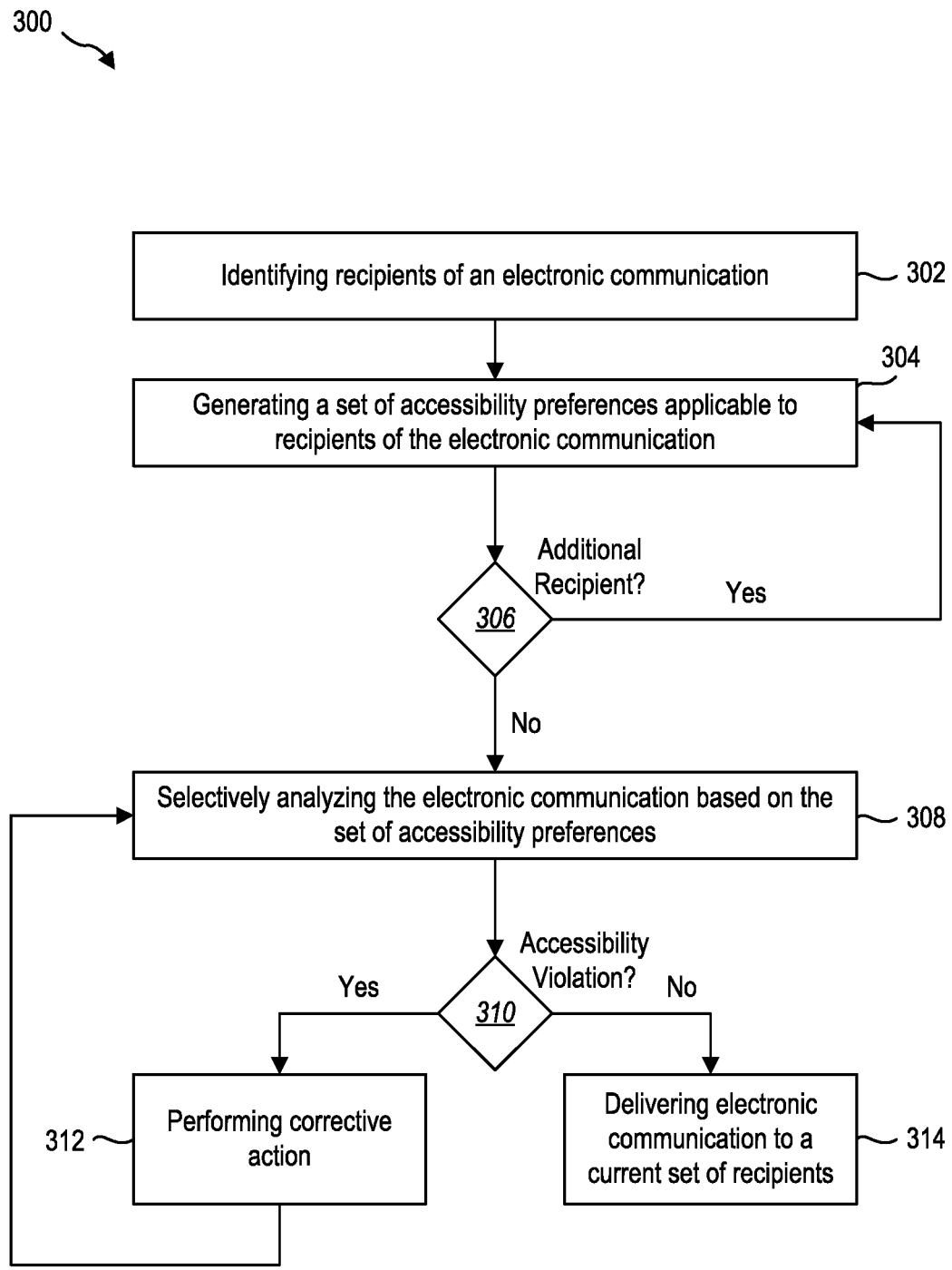
FIG. 3 illustrates an example series of acts for updating and implementing relevant accessibility preferences for an electronic message in accordance with one or more embodiments.
Figure 4:
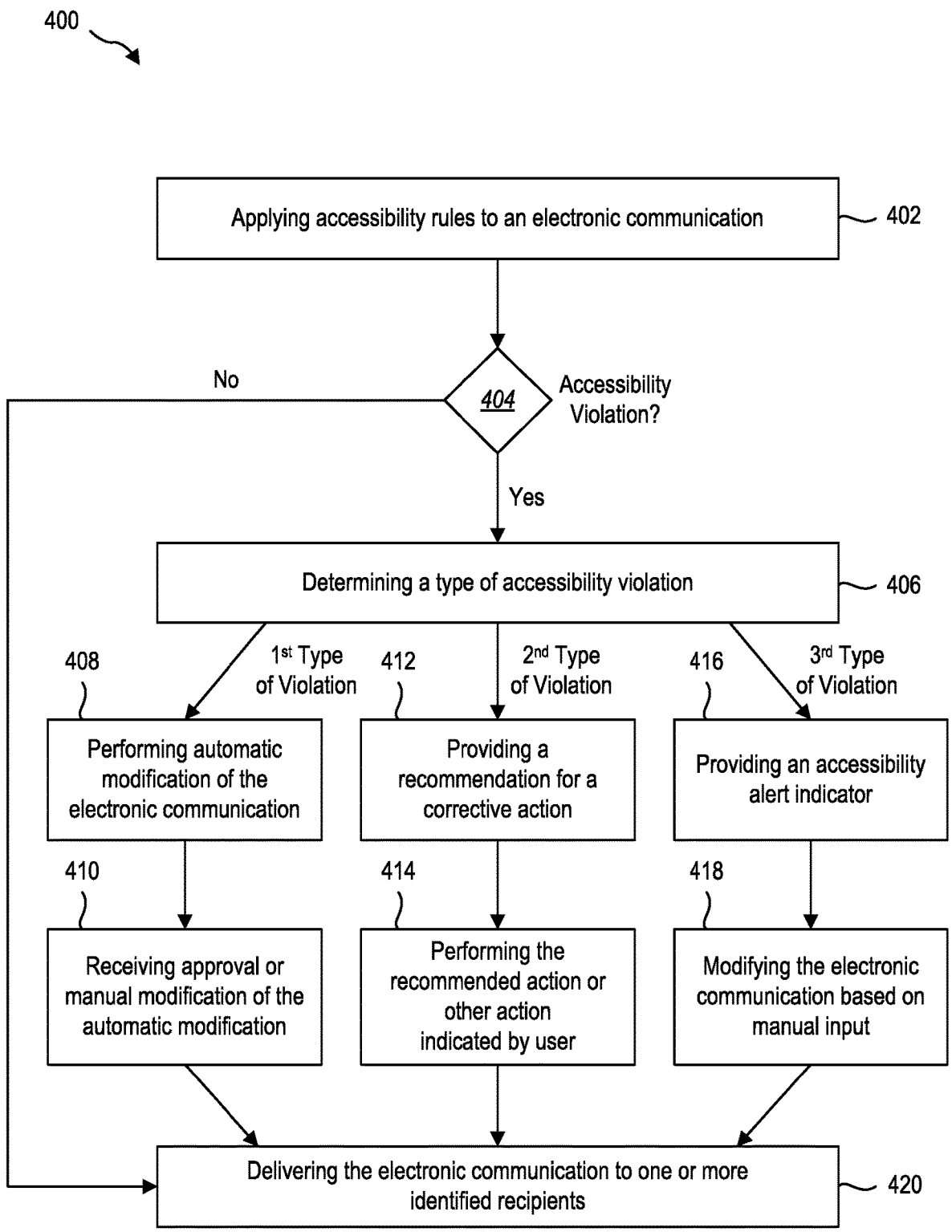
FIG. 4 illustrates an example series of acts for determining one or more modifications to apply to content of an electronic message for delivering accessible content in accordance with one or more embodiments.

Additional detail will now be provided in connection with various example implementations. In particular, FIGS. 2-4 provide example series of acts to illustrate features and functionality of components discussed above in connection with FIG. 1. It will be understood that one or more acts described in connection with respective examples may be combined in any order with acts described in connection with other examples. For instance, while FIG. 2 describes a series of acts that involves applying accessibility rules while a user composes or otherwise adds new content to a body of an electronic communication, any one of these acts or multiple acts described in connection with FIG. 2 may be combined with acts described in connection with FIG. 3 associated with selectively identifying only those accessibility preferences that are applicable to a current set of identified recipients. Similarly, any of the acts discussed in connection with FIGS. 2 and 3 may be combined with any of the acts discussed in connection with FIG. 4 related to performing a variety of corrective actions depending on a type of detected accessibility violation.

FIG. 2 illustrates an example series of acts 200 related to identifying one or more applicable accessibility preferences for an electronic communication and applying a corresponding set of accessibility rules to content of the electronic communication as new content is added to a body of the electronic communication. For instance, the series of acts 200 may include an act 202 of identifying an accessibility preference for at least one recipient of an electronic communication. In one or more embodiments, the communication application 114 on the client device 112 determines any number of applicable accessibility preferences for one or more recipients that have been identified for the electronic communication.

The communication application 114 can identify one or more accessibility preferences for the electronic communication in a variety of ways. For example, in one or more embodiments, the communication application 114 provides a call to the communication system 104 on the server device(s) 102 to request an identification of any accessibility preferences that are applicable for an identified set of recipients. In one or more embodiments, the communication system 104 selectively provides an identification of any accessibility preferences and associated recipients as well as any accessibility rules to apply to content of the electronic communication.

As an alternative to performing a server call for each electronic communication, in one or more embodiments, the communication application 114 stores any recipient information (e.g., including accessibility preference information) on a storage of the client device 112. For instance, the communication application 114 can store accessibility preference information for commonly used recipients or recipients that are part of a locally stored contact list. When preparing subsequent electronic communications for transmission, the communication application 114 can identify preference information from the locally stored information rather than performing another server call. In this way, the communication application 114 can apply accessibility rules to content of an electronic communication for regularly used recipients even where the client device 112 may not have a reliable or current connection with the server device(s) 102 via the network 128.

Storing and implementing locally stored accessibility preference data in accordance with one or more embodiments further provides flexibility in applying accessibility rules to electronic communications even where the electronic communication may be transmitted at a later time. For instance, a user may compose an electronic communication offline while ensuring compliance with applicable accessibility preferences. The user may then transmit the electronic communication upon establishing a reliable wireless connection with a communication server and/or upon establishing a WiFi connection (or other connection) to avoid overusing limited data (e.g., mobile data).

In one or more embodiments, the communication application 114 may not have access to information indicating whether a particular recipient has indicated a preference to receive accessible content. In this case, the communication application 114 may identify a default accessibility preference for an "unknown" user to apply to the electronic communication. Indeed, where a recipient has no accessibility preference information available, this absence of accessibility preference information may be interpreted as a default accessibility preference having an associated set of accessibility rules to apply to content of the electronic communication.

As further shown in FIG. 2, the communication application 114 can perform an act 204 of detecting new content added to the electronic communication. This may include detecting new content added to a body of the electronic communication. In addition, or as an alternative, this may include detecting new content added via an attachment or a linked document. Indeed, the communication application 114 may begin detecting or otherwise monitoring for new content upon first creating the communication and/or initiating a message interface.

The communication application 114 may additionally perform an act 206 of determining whether a violation exists within the new content. In one or more embodiments, the communication application 114 can begin monitoring new content as soon as a relevant set of accessibility preferences are identified for the electronic communication. Where the recipients are identified before any new content is added to the electronic communication, the communication application 114 can begin applying accessibility rules to new content immediately. Alternatively, where recipients are identified after a portion of new content has been added to the electronic communication, the communication application 114 can instead apply accessibility rules to the portion of content previously added and begin iteratively applying the accessibility rules to the new content as it is added to the electronic communication.

Where no violations have been detected within the new content (or previously composed content), the communication application 114 can perform an act 208 of determining whether the electronic communication is finished. Where the electronic communication is finished (e.g., where a user of the client device 112 selects a "send" button), the communication application 114 can perform an act 220 of delivering the electronic message to the recipient(s). Alternatively, where the electronic communication is not finished (e.g., where a "send" button has yet to be selected), the communication application 114 can again perform act 204 and detect new content as it is composed or otherwise added to the electronic communication.

As shown in FIG. 2, where the communication application 114 has detected an accessibility violation, the communication application 114 may perform an act 210 of providing an accessibility alert indicator. In particular, the communication application 114 can provide an indicator via a graphical user interface of the client device 112 to indicate that one or more accessibility violations have been detected within content of the electronic communication. In one or more embodiments, the communication application 114 provides the accessibility indicator upon detecting a first accessibility violation. In one or more embodiments, the communication application 114 may continue monitoring new content for accessibility violations (e.g., without modifying the accessibility alert indicator). Alternatively, the communication application 114 may stop monitoring new content for accessibility violations until receiving a command to perform a scan of the entire electronic communication.

The communication application 114 may provide the accessibility alert indicator in a variety of ways. For example, in one or more embodiments, the communication application 114 provides a visual indicator in a header of the electronic communication. Alternatively, the communication application 114 can provide the accessibility alert indicator in-line or at a location of the detected violation. As an alternative (or in addition) to visual indicators, the communication application 114 can provide other types of sensory indicators based on settings or preferences indicated by a user of the client device 112. For instance, the communication application 114 can provide an audible indicator (e.g., an audible tone via a speaker device) and/or haptic feedback (e.g., a vibration or other indicator of an input device) to indicate that an accessibility violation has been detected.

As further shown, the communication application 114 can perform an act 212 of detecting a command to evaluate the electronic communication. For example, based on the accessibility alert indicator, the user of the client device 112 may select an option or input a command to run a more comprehensive scan of the electronic communication. For instance, where evaluating new content added to the electronic communication may involve selectively applying accessibility rules to a body of the electronic communication, the user of the client device 112 may select an option associated with evaluating other portions of the electronic communication including attachments and/or linked content. Moreover, where the accessibility alert indicator is provided only after detecting a first accessibility violation and no further analysis of the electronic communication has been performed, the command to run the comprehensive scan may refer to a command to evaluate a remaining portion of the electronic communication that has yet to be analyzed.

In response to receiving the command to evaluate the electronic communication, the communication application 114 may perform an act 214 of applying accessibility rules to the electronic communication. In particular, the communication application 114 can apply any number of applicable accessibility rules to the entirety of the electronic communication. In one or more embodiments, the communication application 114 performs a more comprehensive analysis of the electronic communication upon receiving the command than when evaluating the new content added to the electronic communication. For example, where the communication application 114 may only analyze content of the electronic message added to the body of the electronic communication, the communication application 114 may alternatively apply the accessibility rules to the body of the electronic communication in addition to attachments and/or linked documents referenced within the body of the electronic communication.

Upon identifying any number of accessibility violations (e.g., at least the one corresponding to the violation detected within the new content), the communication application 114 can perform an act 216 of determining whether to take a corrective action with respect to the content that fails to comply with the accessibility preference. For instance, in one or more embodiments, the user of the client device 112 may ignore the accessibility violations and select an option to send the electronic communication without performing corrective action. In this case, the communication application 114 performs the act 220 of delivering the electronic communication to the identified recipient(s) without further modification.

Alternatively, where the communication application 114 determines that corrective action is to be performed, the communication application 114 can perform an act 218 of taking one or more corrective actions with respect to content of the electronic communication. In particular, the communication application 114 may automatically perform one or more corrective actions to the content of the electronic communication or may enable a user to manually perform one or more modifications to the content. Further detail in connection with performing different types of corrective action is discussed below in connection with FIG. 4. After performing the corrective action(s), the communication application 114 can return to act 204 and detect any additional content added to the electronic communication. Alternatively, where the communication is finished upon taking the one or more corrective actions (e.g., where applying the accessibility rules is part of preparing the communication for delivery), the communication application 114 may perform the act 220 of delivering the electronic communication to the identified recipients.

FIG. 3 illustrates another example series of acts 300 associated with identifying a set of accessibility preferences and corresponding accessibility rules to apply to content of an electronic communication. As mentioned above, these acts may be combined with any combination of the acts 202-220 discussed above in connection with the series of acts 200 shown in FIG. 2. As shown in FIG. 3, the communication application 114 can perform an act 302 of identifying recipients of an electronic communication. The recipients may include any number of recipients associated with any number and variety of accessibility preferences.

As further shown, the communication application 114 may perform an act 304 of generating a set of accessibility preferences applicable to the recipients of the electronic communication. In particular, the communication application 114 can generate a set of accessibility preferences including a subset of a collection of accessibility preferences representative of all possible accessibility preferences for all recipients known to the communication system 104. As mentioned above, the accessibility preferences may include a variety of different accessibility preferences for different individuals based on corresponding accessibility needs.

In one or more embodiments, the communication application 114 generates the set of accessibility preferences by compiling a set of accessibility rules representative of all applicable accessibility preferences for a current set of recipients for the electronic communication. For example, the communication application 114 may compile a listing of accessibility rules to apply to the electronic communication that, when applied to content of an electronic communication, will detect any accessibility violations for the current set of recipients. As mentioned above, where different accessibility preferences include one or more common accessibility rules, the communication application 114 may identify non-redundant or a subset of accessibility rules that are inclusive of all the rules from the identified set of accessibility preferences.

As an illustrative example, where a first accessibility preference includes a first accessibility rule that indicates that no yellow text should be used on a white background while a second accessibility preference includes a second accessibility rule that indicates a minimum allowable contrast ratio between adjacent pixels of the electronic communication, the communication application 114 may determine that the first accessibility rule is inclusive of the second accessibility rule. In this case, the communication application 114 may ignore the first accessibility rule and simply add the second accessibility rule to the set of accessibility rules for the current set of recipients since enforcement of the second accessibility rule will similarly detect any accessibility violations where the first accessibility rule is similarly violated. The communication application 114 may apply a similar analysis to other accessibility preferences and associated accessibility rules in generating the set of accessibility preferences applicable to a current set of recipients.

As mentioned above, the communication application 114 can maintain a dynamic set of accessibility preferences applicable to any current combination of recipients. For example, as shown in FIG. 3, the communication application 114 can perform an act 306 of detecting whether any additional recipients have been added to (or removed from) the set of identified recipients. Where one or more additional recipients have been detected, the communication application 114 can update or further generate the set of accessibility references applicable to the updated set of recipients. In one or more embodiments, the communication application 114 updates or further generates the set of accessibility references based on any detected change in the set of recipients that have been identified for the electronic communication.

The communication application 114 can update the set of accessibility preferences in a number of ways. For example, where an added recipient has indicated one or more accessibility preferences, the communication application 114 can add the accessibility preference(s) to a current list of applicable accessibility preferences. This may include adding any number of accessibility rules to a current set of accessibility rules that are to be applied to content of the electronic communication. Alternatively, where a recipient is removed from a recipient list associated with an accessibility preference, the communication application 114 may determine whether any of the remaining recipients have indicated accessibility preferences. Where none of the remaining recipients have indicated that they wish to receive accessible content, the communication application 114 can update the accessibility preferences by removing those accessibility preferences associated with the recipient that was removed.

The communication application 114 may generate and update the set of accessibility preferences based on information from one of a variety of sources. For example, where the recipient data 108 and accessibility preference data 110 is maintained exclusively on the server device(s) 102, the communication application 114 can provide a server call to the communication system 104 and receive an identification of the subset of accessibility preferences and corresponding accessibility rules to apply to the electronic communication from the server device(s) 102. Alternatively, where the communication application 114 stores some or all of the accessibility preference data 110 and recipient data 108 on a local storage of the client device 112, the communication application 114 can locally access the subset of accessibility preferences and corresponding accessibility rules and apply the identified subset of accessibility rules to the content of the electronic communication.

As shown in FIG. 3, where accessibility preferences have been identified and where no additional recipients have been detected, the communication application 114 can perform an act 308 of selectively analyzing the electronic communication based on the set of accessibility preferences. As mentioned above, the identified set of accessibility preferences may include a subset of all possible accessibility preferences that may be indicated for a set of recipients. As such the communication application 114 may apply a subset of all possible accessibility rules to the content of the electronic communication where only a subset of accessibility preferences has been indicated. In this way, the communication application 114 may selectively apply only those accessibility rules that apply to the current set of recipients rather than applying one or more additional accessibility rules to the content of the electronic message.

As shown in FIG. 3, the communication application 114 can perform an act 310 of determining whether one or more accessibility violations exist within the electronic communication. This may include identifying a first accessibility violation and waiting to perform additional analysis, as discussed above in connection with the example of FIG. 2. Alternatively, this may include evaluating more comprehensive portions of the electronic communication (e.g., an entire body of the communication, attachments, linked documents) to determine whether any number of accessibility violations exist within the content of the electronic communication.

Where the communication application 114 detects that one or more accessibility violations exist within the electronic communication, the communication application 114 can perform an act 312 of performing a corrective action. This may include automatically correcting one or more accessibility deficiencies without receiving user input. Alternatively, this may include providing recommendations for corrective actions and/or simply providing an indication of the accessibility violations via one or multiple accessibility alert indicators. After performing one or more corrective actions, the communication application 114 may continue performing act 308 of selectively analyzing the electronic communication based on the set of accessibility preferences. Indeed, in one or more embodiments, the communication application 114 may iteratively perform acts 308-312 on each detected accessibility rule violation until no additional violations are detected within the electronic communication. As shown in FIG. 3, where the communication application 114 does not identify any accessibility violations within the electronic document (or where all accessibility violations have been addressed), the communication application 114 can perform an act 314 of delivering the electronic communication to the current set of recipients.

FIG. 4 illustrates another examples series of acts 400 associated with applying one or more identified accessibility preferences to an electronic communication and performing one or more corrective actions based on a type of detected accessibility violation. These acts may be combined with any combination of the acts discussed above in the series of acts 200, 300 shown in FIGS. 2 and/or 3. For example, while not shown in FIG. 4, the communication application 114 can perform one or more of the above-described acts to identify and update a set of accessibility preferences and associated accessibility rules to apply to the content of the electronic communication.

As shown in FIG. 4, the communication application 114 may perform an act 402 of applying accessibility rules to the electronic communication. This may include applying the accessibility rules to a select portion of the electronic communication (e.g., a body of an email or based on detecting new content added to the electronic communication). This may further include applying the accessibility rules to any number of portions that make up the electronic communication. In one or more embodiments, the communication application 114 applies the accessibility rules to selective portions of the electronic communication based on instructions or settings of corresponding accessibility preferences indicating portions of the electronic communication to which the accessibility rules should apply.

As further shown and in accordance with one or more embodiments described herein, the communication application 114 can perform an act 404 of determining whether one or more accessibility violations exist within the electronic communication. Similar to one or more embodiments described above, where no accessibility violation has been detected, the communication application 114 can perform an act 420 of delivering the electronic communication to an identified set of one or more recipients.

Alternatively, where the communication application 114 has detected one or more accessibility violations, the communication application 114 can perform an act 406 of determining a type of accessibility violation. For example, the communication application 114 can determine which accessibility preference has been violated. The communication application 114 may also determine a specific accessibility rule (or multiple rules) that has been violated. For instance, where an accessibility preference indicates a preference that images included within the body of an email comply with WCAG (or other known accessibility standards), the communication application 114 may specifically identify that an image provided within the body of the email fails to comply with WCAG and provide said identification to a corrective action manager 124 for use in determining a corresponding action to take. As another example, where an accessibility preference indicates a preference that specific colors or contrast ratios not be included within the body and/or attached documents of an email, the communication application 114 may similarly identify the type of accessibility violation and provide an indication of the specific violation to the corrective action manager 124.

In one or more embodiments, the communication application 114 performs a variety of corrective actions based on corresponding types, categories, or groupings of accessibility violations that have been detected. FIG. 4 illustrates one example in which three different types of accessibility violations have three different corresponding corrective actions. Nevertheless, the communication application 114 may perform any number of different corrective actions based on a variety of types of accessibility violations.

For example, as shown in FIG. 4, in response to detecting a first type of accessibility violation, the communication application 114 can perform an act 408 of performing an automatic modification of the electronic communication to correct the accessibility violation. For instance, where an accessibility violation is easy to correct (e.g., where a pixel color can be changed to a default color) and has a defined corrective action, the communication application 114 can simply perform an automatic correction of the content without receiving a specific input or command to modify the content of the electronic communication.

In one or more embodiments, the communication application 114 may provide a visible indicator of the automatic correction to allow a user to confirm the automatic correction. For example, as shown in FIG. 4, the communication application 114 can perform an act 410 of receiving approval or manual modification of the automatic modification. This may include selecting an "accept" button or allowing the user of the client device to manually change the automatic modification performed by the communication application 114. Alternatively, where a user ignores an automatic modification and indicates that the message is complete (e.g., selects a "send" button), the communication application 114 may similarly interpret an ignored automatic modification as a confirmation of the automatic change.

As further shown in FIG. 4, in response to detecting a second type of accessibility violation, the communication application 114 can perform an act 412 of providing a recommendation for a corrective action. For example, where a specific violation may not have a clear or defined modification to correct the accessibility violation, the communication application 114 may instead provide a recommendation for one or multiple corrective actions that may be performed to fix the accessibility violation. The communication application 114 may perform an act 414 of performing a recommendation action or other action indicated by a user of the client device 112. For example, where a user selected a recommended action, the communication application 114 can apply the recommended action to the content. Alternatively, the user may provide a manual input or command that similarly brings the content in compliance with the violated accessibility preference.

As further shown in FIG. 4, in response to detecting a third type of accessibility violation, the communication application 114 can perform an act 416 of providing an accessibility alert indicator to indicate the accessibility violation. For example, where the to communication application 114 is unable to identify an automatic modification and/or recommendation to provide, the communication application 114 may instead provide a visual, audible, or haptic alert without performing any automatic modification or otherwise providing a recommendation. The communication application 114 may further perform an act 418 of modifying the electronic communication based on manual input.

In each of the above example, the communication application 114 can perform the act 420 of delivering the electronic communication to the recipient(s) after each of the accessibility violations have been resolved. In addition, or as an alternative, the communication application 114 can deliver the electronic communication with or without complying with accessibility preferences in response to the user of the client device 112 selecting a command to deliver, share, or otherwise send the electronic communication to the target audience (e.g., the identified set of recipients).

Figure 5A:
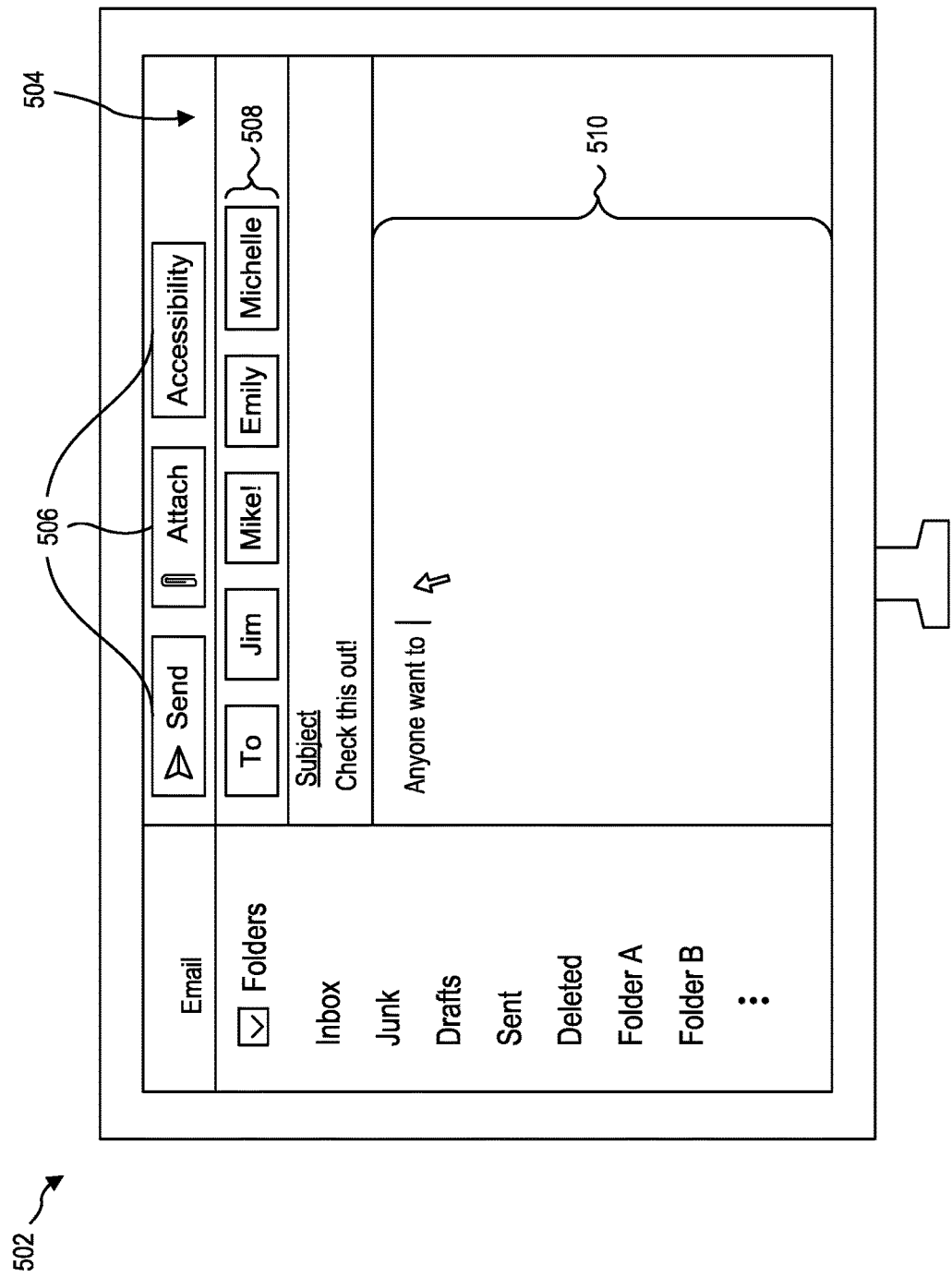
FIGS. 5A-5E illustrate example graphical user interfaces that show one or more features and functionality of a communication application in accordance with one or more embodiments.

Additional detail will now be given by way of an example email interface in connection with FIGS. 5A-5E. In particular, FIG. 5A illustrates an example client device 502 and a graphical user interface 504 of an email client on the client device 502. The client device 502 may include similar features and functionality as the client device 112 herein and illustrated in FIG. 1. As shown in FIG. 5A, the graphical user interface 504 includes selectable commands 506 to enable a user to send an email and/or attach one or more files (e.g., photos, videos, documents) to the email. As further shown, the selectable commands 506 may include an accessibility command that enables a user to apply any number of accessibility rules to content of the email.

As further shown, the graphical user interface 504 includes a displayed set of recipients 508 that have been added. As discussed above, the set of recipients 508 may include any number of recipient identifiers (e.g., usernames, email addresses) to identify intended recipients of the email. As shown in FIG. 5A, one or more of the recipients may include an explanation point or other indicator that identifies one or more recipients that have identified accessibility preferences due to physical limitations, personal preference, or other individual reasons (or that have not changed default preferences associated with receiving accessible content). For example, while recipients "Jim," "Emily," and "Michelle" may not have indicated any accessibility preferences, "Mike" has indicated one or more accessibility preferences to be considered in preparing and sending the email.

As further, shown, the graphical user interface 504 includes a body 510 of the email. In particular, the body 510 may include a portion of the email within which a user of the client devices 502 may add content, such as text, photos, tables, or other digital content items. As discussed in one or more embodiments above, a communication application 114 (e.g., an email client) may analyze content of the email including content from within the body 510 of the email as well as attached and/or linked content to determine whether the content of the email complies with one or more accessibility preferences associated with the set of recipients 508.

Figure 5B:
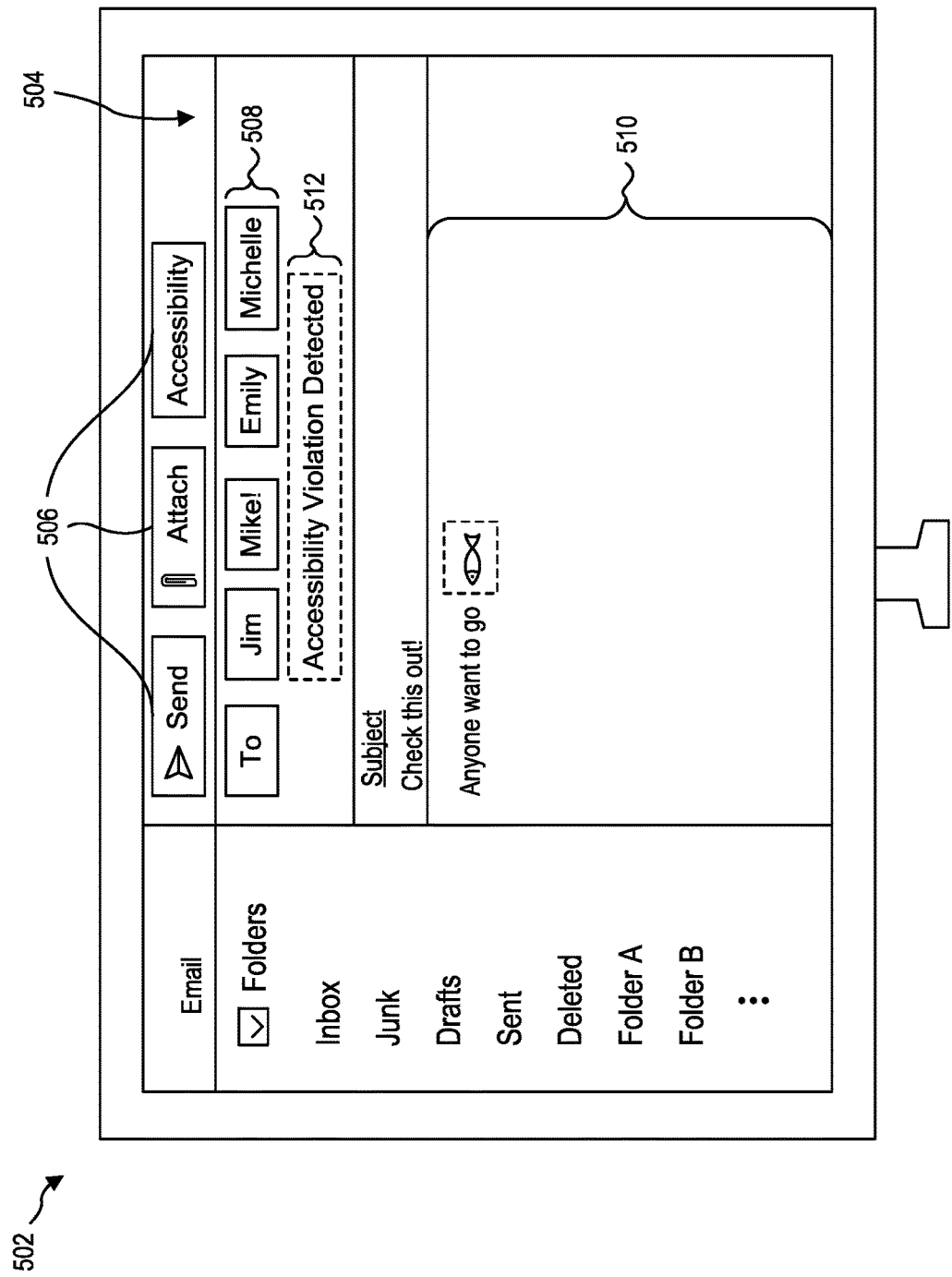

FIG. 5B illustrates a further example of the graphical user interface 504 displayed on the client device 502 in which content has been added to the body 510 of the email. For example, as shown in FIG. 5B, a user of the client device 502 may add text and a graphic (e.g., an emoji) to the body of the email in which the sender of the email wishes to convey an invitation to the set of recipients 508 to go fishing. In this example, an accessibility preference applicable to a recipient (Mike) may indicate that images without supplemental text should not be included within a body 510 of the email. Based on this accessibility preference, the communication application 114 may apply corresponding accessibility rules to additional content of the body 510 while it is composed to detect a non-compliant image within the body 510 of the email. Based on detecting content that fails to comply with the indicated accessibility preference, the graphical user interface 504 may include an accessibility alert indicator 512 indicating that an accessibility violation has been detected.

As discussed above, the graphical user interface 504 may include a single accessibility alert indicator 512 to indicate any number of violations. For example, in one or more embodiments, the communication application 114 provides the accessibility alert indicator 512 in response to detecting a first violation. The communication application 114 may maintain the display of the accessibility alert indicator 512 until a user of the client device 502 selects the accessibility command to perform a more comprehensive analysis of the email. In one or more embodiments, the communication application 114 provide an accessibility alert indicator for each detected violation (e.g., in-line or within the body 510 of the email).

Figure 5C:
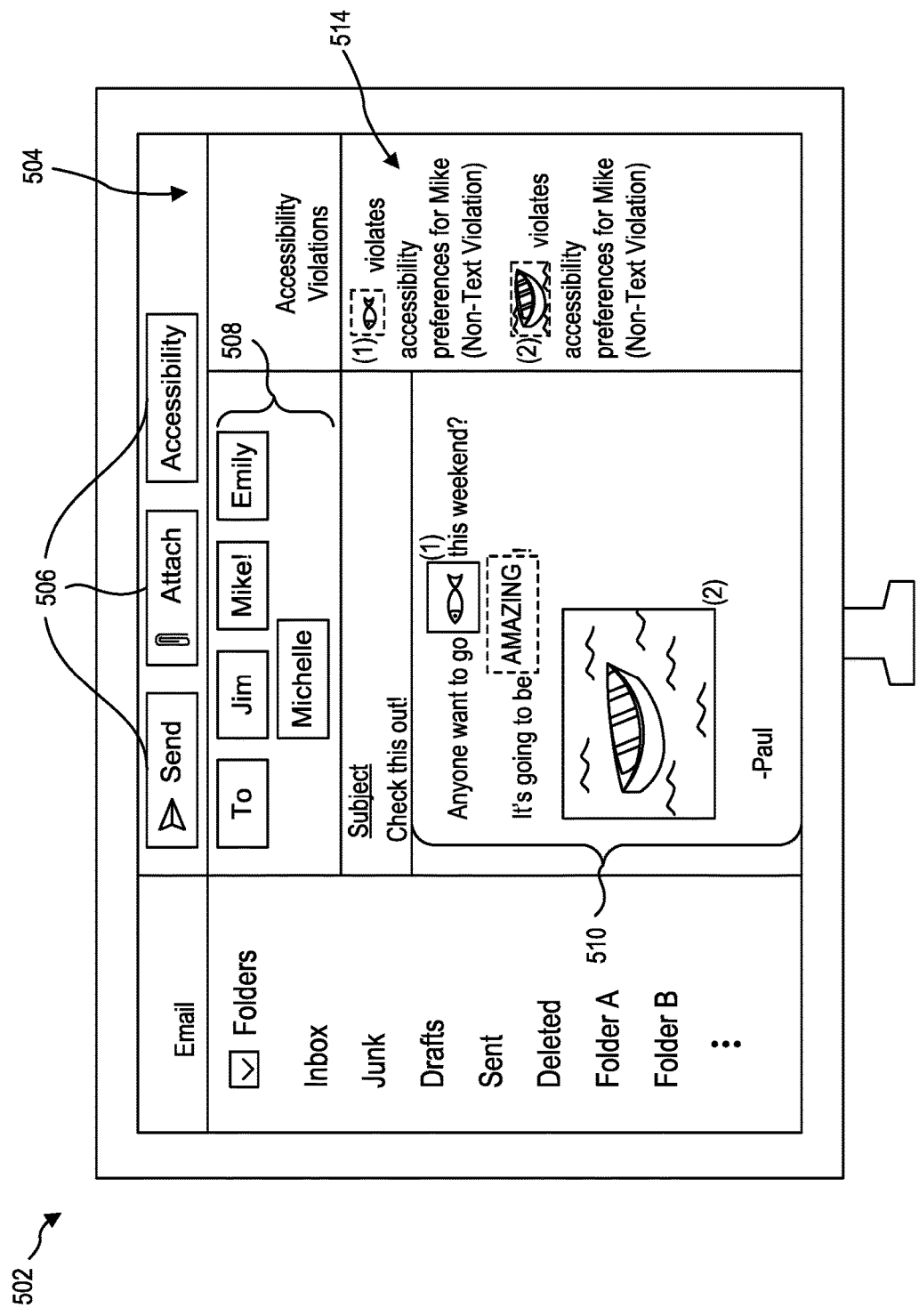

FIG. 5C illustrates an example graphical user interface 504 after a remaining portion of the email has been composed and after an accessibility command has been selected in accordance with one or more embodiments. In particular, as shown in FIG. 5C, the body 510 of the email may include additional content including an invitation to go fishing, a pitch that it will be "AMAZING" and a photo of a boat. As shown in FIG. 5C, the word "AMAZING" is dashed indicating that the word is highlighted or has a different font color than other words within the body of the email. In the example discussed above, a recipient (Mike) may have indicated an accessibility preference to not receive any images within the body 510 of the email without descriptive text. Accordingly, in this example, the body 510 of the email shown in FIG. 5C may include multiple accessibility violations corresponding to a set of preferences that should be applied to the email.

While FIG. 5B illustrates that a single accessibility alert indicator 512 may be provided to indicate any number of accessibility violations, in response to detecting a selection of the accessibility command, the graphical user interface 504 may include an accessibility pane 514 including an identification of any number of accessibility violations for the email. In particular, the accessibility pane 514 includes a first identification of a first accessibility violation indicating that an image (e.g., an emoji) of a fish is in violation of a set of accessibility rules that apply to the set of recipients 508. As further shown, the accessibility pane 514 may include a second identification of a second accessibility violation indicating that the image of the boat is similarly in violation of the set of accessibility rules that apply to the set of recipients 508. As shown in FIG. 5C, the accessibility pane 514 may include a description of the accessibility violations to alert the sender of the email as to why the email is non-compliant with accessibility preferences of the recipients 508.

Figure 5D:
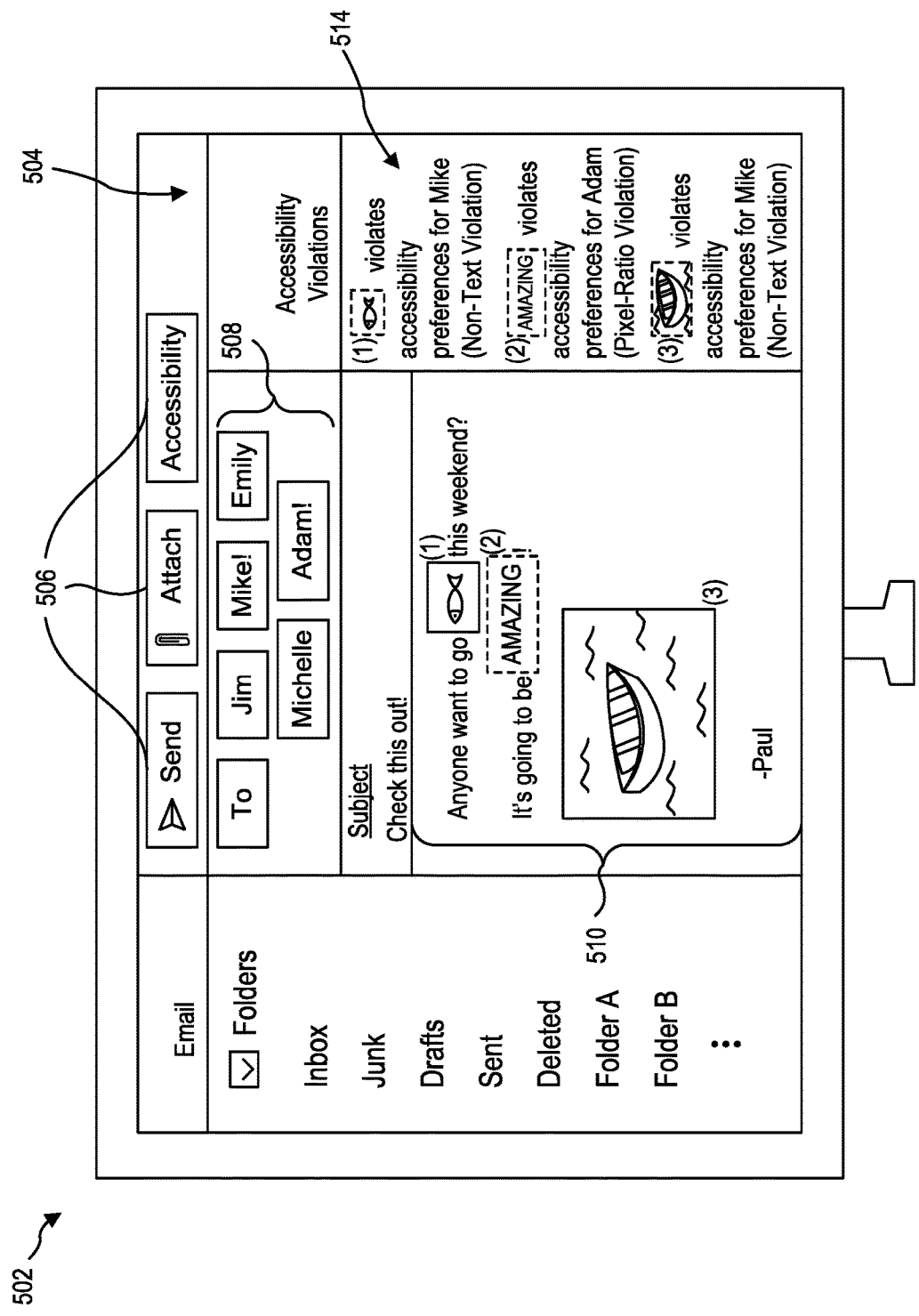

FIG. 5D illustrates another example graphical user interface 504 in which a new recipient ("Adam") has been added to a set of recipients 508 for the email. In particular, as shown in FIG. 5D, the new recipient has indicated a preference to receive accessible content when receiving emails. While the indicated accessibility preferences may include the same preference(s) as other recipients, where one or more indicated accessibility preferences differ from a previous set of recipients, the communication application 114 may update a set of accessibility preferences and corresponding accessibility rules that should apply to the email.

In this example, the new recipient has indicated an accessibility preference indicating that certain ranges of contrast ratios should not be used within content of the email. As a result, in addition to including indicators of the accessibility violations discussed above in connection with FIG. 5C, the communication application 114 may additionally identify and provide an indicator of a further accessibility violation indicating that a highlighted word "AMAZING" within the body 510 of the email violates an updated set of accessibility rules.

Figure 5E:
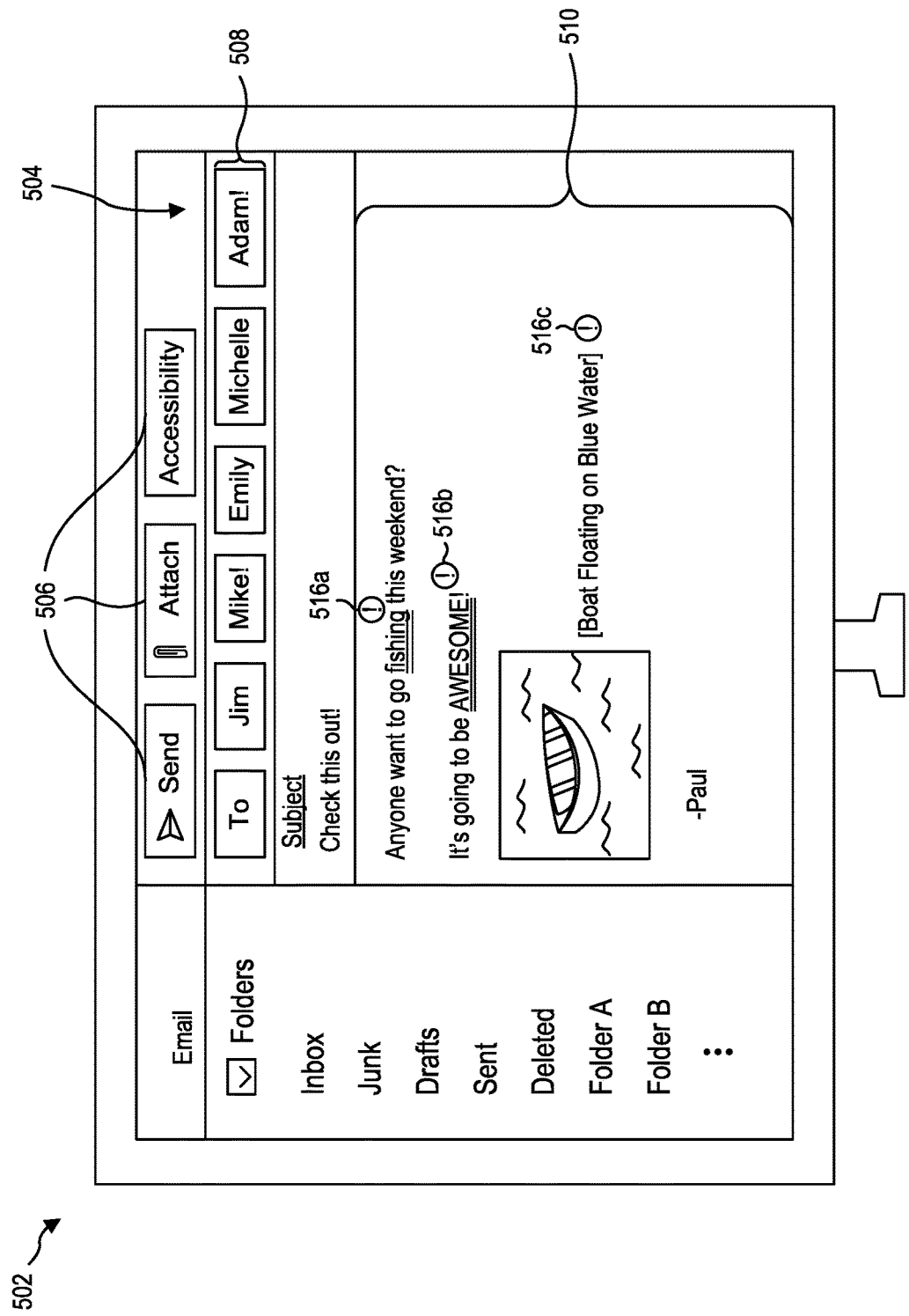

As discussed above, the communication application 114 may perform a variety of corrective actions associated with different types of accessibility violations ranging from automatically modifying content of an email to providing recommendations and/or notifications of accessibility violations. FIG. 5E illustrates an example graphical user interface 504 in which modifications and/or recommendations have been applied to the email that place portions of the email in compliance with accessibility preferences of the set of recipients 508.

For example, the graphical user interface 504 includes a first action indicator 516a indicating that a graphic of a fish has been modified to read "fishing." The graphical user interface 504 further includes a second action indicator 516b indicating that a highlighted word ("AMAZING") has been unhighlighted. Moreover, the graphical user interface 504 includes a third action indicators 516c indicating that supplemental text has been added to the photo of the boat within the body 510 of the email.

A user of the client device 502 may interact with these action indicators 516a-c in a variety of ways. For example, the user of the client device 502 may select one or more of the action indicators 516a-c to confirm the modifications to the email. In addition, or as an alternative, the user may modify one or more of the modifications. For example, the user of the client device 502 may enter additional text or different text to describe the photo of the boat in further detail or to modify the correction generated using a captioning model (e.g., a machine learning model) implemented by the communication application 114. Upon accepting and/or modifying each of the changes to the email, the user of the client device 502 may select a command to send the email to the set of recipients 508.

Figure 6:
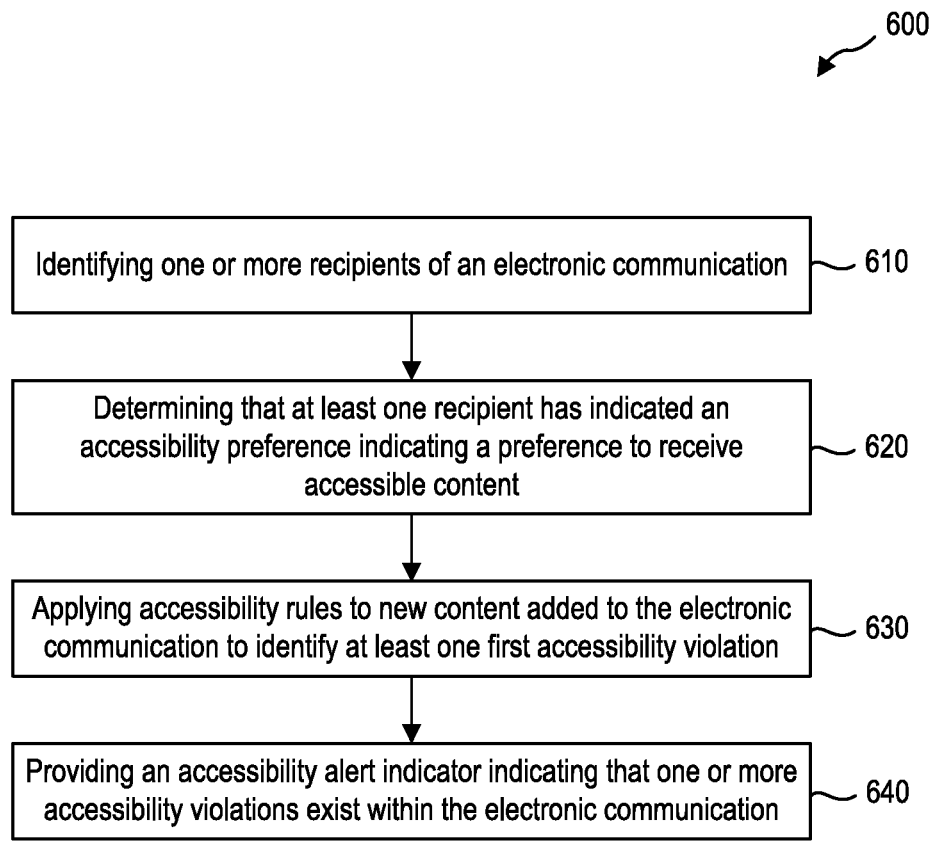
FIG. 6 illustrates an example method for providing accessible content to one or more recipients in accordance with one or more embodiments.
Figure 7:
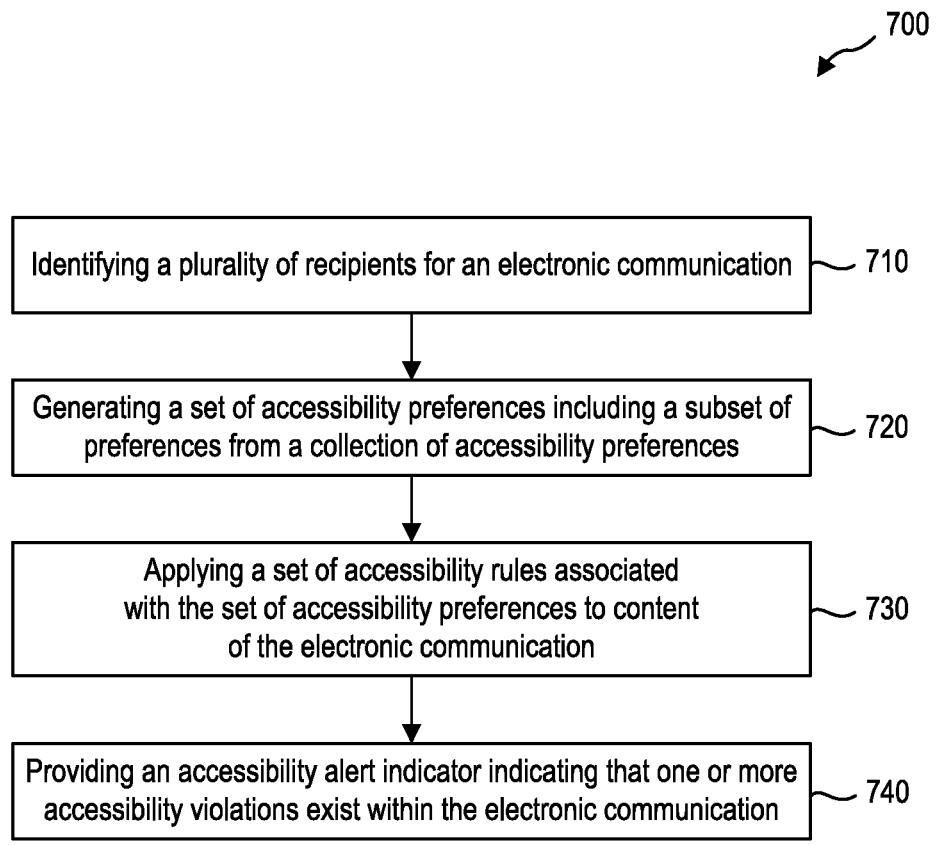
FIG. 7 illustrates another example method for providing accessible content to one or more recipients in accordance with one or more embodiments.

Turning now to FIGS. 6-7, these figures illustrate example flowcharts including series of acts for selectively evaluating content of electronic communications and enabling a sender to modify content of the electronic communication in accordance with relevant accessibility preferences. While FIGS. 6-7 illustrates acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device (e.g., a server device and/or client device) to perform the acts of FIGS. 6-7. In still further embodiments, a system can perform the acts of FIGS. 6-7.

For example, FIG. 6 illustrates a series of acts 600 related to identifying and selectively applying accessibility preferences to apply to content of an electronic message. As shown in FIG. 6, the series of act 600 includes an act 610 of identifying one or more recipients of an electronic communication. The one or more recipients may include any number of recipients indicated within a header of an electronic communication.

As further shown, the series of acts 600 may include an act 620 of determining that at least one recipient has indicated an accessibility preference indicating a preference to receive accessible content. In one or more embodiments, the act 620 includes determining that at least one recipient of the one or more recipients has indicated an accessibility preference associated with one or more accessibility rules to apply to the electronic communication. Determining that at least one recipient has indicated the accessibility preference may include providing, to a communication server, a call for accessibility preference information for the one or more identified recipients of the electronic communication and receiving, from the communication server, accessibility preference information indicating that the at least one recipient has indicated the accessibility preference. In one or more embodiments, determining that at least one recipient has indicated the accessibility preference includes identifying a first recipient of the one or more recipients for which no accessibility preference information is available and, based on an absence of accessibility preference information for the first recipient, associating the first recipient with the accessibility preference associated with receiving accessible content within electronic communications.

As further shown, the series of acts 600 may include an act 630 of applying accessibility rules to new content added to the electronic communication to identify at least one accessibility violation. For example, the act 630 may include applying, while new content is being added to the electronic communication and based on determining that the at least one recipient has indicated the accessibility preference, the one or more accessibility rules to the electronic communication to identify at least one accessibility violation (e.g., a first accessibility violation) of the electronic communication.

As further shown, the series of acts 600 may include an act 640 of providing an accessibility alert indicator indicating the one or more accessibility violations exist within the electronic communication. For example, the act 640 may include providing, via a client device, an accessibility alert indicator indicating that one or more accessibility violations have been detected. Providing the accessibility alert indicator may providing a variety of different indicators including, by way of example, a visual indicator via a graphical user interface of the client device, an audio indicator via a speaker device in communication with the client device, or a haptic indicator via an input device in communication with the client device.

The accessibility alert indicator may include a selectable option to initiate an analysis of the electronic communication. In response to detecting a selection of the accessibility alert indicator, the series of acts 600 may include performing further analysis of the electronic communication to identify one or more additional accessibility violations of the electronic communication. In addition, applying the one or more accessibility rules to the electronic communication may include applying the one or more accessibility rules to content from a body of the electronic communication up until identifying the at least one accessibility violation and without applying the one or more accessibility rules to additional portions of the electronic communication prior to detecting the selection of the accessibility alert indicator.

In one or more embodiments, identifying the one or more recipients includes receiving an identification of a new recipient to be added to one or more previously identified recipients for which no accessibility preferences have been identified. Determining that the at least one recipient has indicated the accessibility preference may include determining that the new recipient has indicated the accessibility preference associated with receiving accessible content within electronic communications. Further, applying the one or more accessibility rules to the electronic communication may include applying the one or more accessibility rules associated with the accessibility preference to a first portion of the electronic communication that has been added to the electronic communication prior to adding the new recipient to identify the at least one accessibility violation of the electronic communication. Furthermore, upon identifying the at least one accessibility violation of the electronic communication, the series of acts 600 may include waiting to apply the one or more accessibility rules to a remaining portion of the electronic communication until detecting a selection of a selectable option associated with applying the one or more accessibility rules to a remaining portion of the electronic communication.

In one or more embodiments, the series of acts 600 includes detecting one or more of an attachment of an electronic document to the electronic communication or a link to an electronic document within a body of the electronic communication. The series of acts 600 may further include applying the one or more accessibility rules to the electronic document to identify the at least one accessibility violation of the electronic communication.

In one or more embodiments, the series of acts 600 includes performing an automatic modification to a body of the electronic communication to place the electronic communication in compliance with the accessibility preference. In one or more embodiments, the accessibility alert indicator includes a selectable option to approve, reject, or modify the automatic modification performed to the body of the electronic communication.

In one or more embodiments, the series of acts 600 includes receiving accessibility preference information from a communication server. The series of acts 600 may also include storing the accessibility preference information within a contact list on a storage of the client device. Identifying the one or more recipients of the electronic communication may include identifying the one or more recipients from the contact list. In addition, determining that the at least one recipient has indicated the accessibility preference may be based on accessibility preference information stored on a storage of the client device.

FIG. 7 also illustrates a series of acts 700 related to identifying and implementing accessibility preferences in connection with content of an electronic communication. For example, as shown in FIG. 7, the series of acts 700 includes an act 710 of identifying a plurality of recipients for an electronic communication. The plurality of recipients may include any number of recipients designated to receive an electronic communication.

As shown in FIG. 7, the series of acts 700 includes an act 720 of generating a set of accessibility preferences including a subset of preferences from a collection of accessibility preferences. For example, the act 720 may include generating a set of accessibility preferences for the plurality of recipients where the set of accessibility preferences comprising includes a subset of accessibility preferences from a collection of accessibility preferences. Generating the set of accessibility preferences may include identifying a list of all accessibility preferences identified for each recipient from the plurality of recipients and merging one or more redundant accessibility preferences from the identified list into the set of accessibility preferences.

In one or more embodiments, generating the set of accessibility preferences includes identifying a first accessibility preference from the collection of accessibility preferences associated with a first recipient from the plurality of recipients and identifying a second accessibility preference from the collection of accessibility preferences associated with a second recipient from the plurality of recipients where the second accessibility preference indicates one or more accessibility rules that are inclusive of one or more accessibility rules associated with the first accessibility preference. Generating the set of accessibility preferences may further involve including the second accessibility preference in the set of accessibility preferences without also including the first accessibility preference in the set of accessibility preferences.

As further shown, the series of acts 700 may also include an act 730 of applying a set of accessibility rules associated with the set of accessibility preferences to content of the electronic communication. For example, the act 730 may include applying a set of accessibility rules associated with the set of accessibility preferences to content of the electronic communication to identify at least one accessibility violation of the electronic communication. In one or more embodiments, applying the set of accessibility rules includes applying the set of accessibility rules to content of the electronic communication without applying one or more additional accessibility rules corresponding to accessibility preferences from the collection of accessibility preferences that are not included within the subset of accessibility preferences.

As further shown, the series of acts 700 may also include an act 740 of providing an accessibility alert indicator indicating the one or more accessibility violations exist within the electronic communication. For example, the act 740 may include providing an accessibility alert indicator indicating the at least one accessibility violation via a graphical user interface of a client device.

In one or more embodiments, the series of act 700 further includes providing, to a communication server, a call for accessibility preference information for the plurality of identified recipients for the electronic communication and receiving, from the communication server, accessibility preference information including a list of accessibility preferences for the plurality of recipients. In one or more embodiments, generating the set of accessibility preferences includes compiling the list of accessibility preferences received from the communication server.

Figure 8:
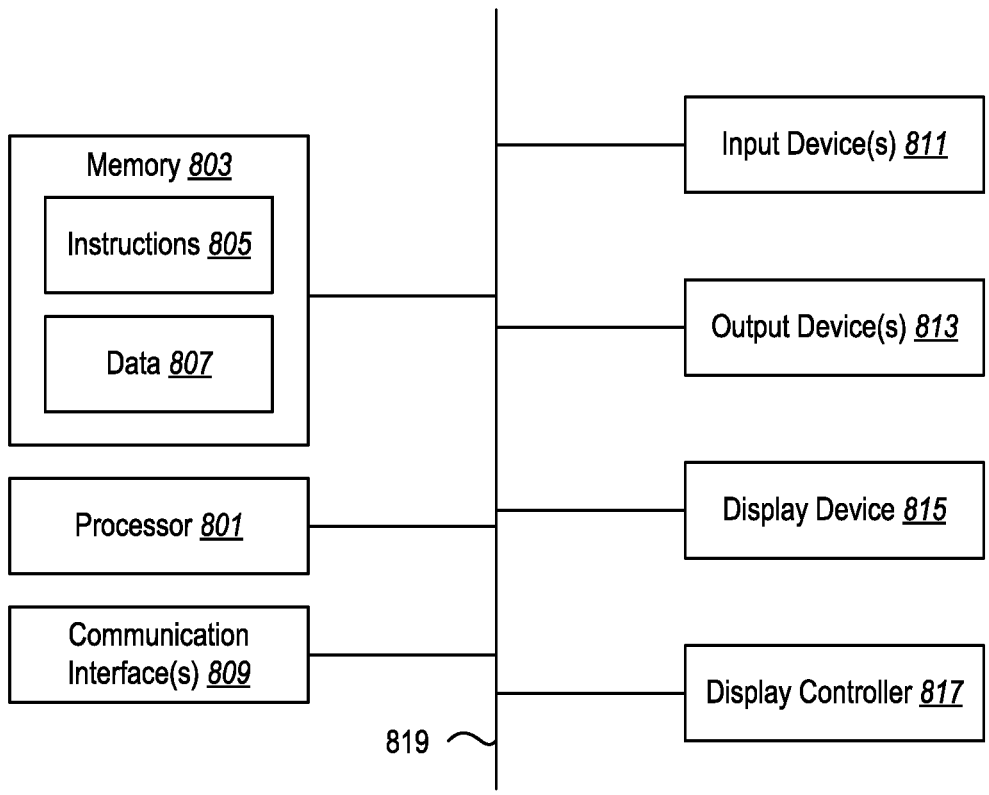
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   identifying a plurality of recipients of an electronic communication;
   determining that at least two recipients of the plurality of recipients have indicated one or more accessibility preferences for the electronic communication;
   generating, from a collection of accessibility preferences, a subset of accessibility preferences corresponding to a combination of accessibility preferences indicated by the at least two recipients;
   determining accessibility rules corresponding to the subset of accessibility preferences;
   applying, while new content is being added to the electronic communication, the accessibility rules to the electronic communication to identify at least one accessibility violation of the electronic communication;
   providing an accessibility alert indicator indicating that one or more accessibility violations have been detected; and
   performing an automatic modification to a body of the electronic communication to place the electronic communication in compliance with the accessibility preferences,
   wherein the accessibility alert indicator comprises a selectable option to approve, reject, or modify the automatic modification performed to the body of the electronic communication.

2. The method of claim 1, wherein determining that the at least two recipients have indicated the accessibility preferences comprises:
   providing, to a communication server, a call for accessibility preference information for the plurality of identified recipients of the electronic communication; and
   receiving, from the communication server, accessibility preference information indicating that the two or more recipients have indicated the accessibility preference.

3. The method of claim 1, wherein identifying the plurality of recipients of the electronic communication comprises receiving an identification of a new recipient to be added to one or more previously identified recipients for which no accessibility preferences have been identified, and wherein determining that the at least two recipients have indicated the one or more accessibility preferences comprises determining that the new recipient has indicated at least one of the one or more accessibility preferences associated with receiving accessible content within electronic communications.

4. The method of claim 3, wherein applying the accessibility rules to the electronic communication comprises applying the accessibility rules associated with the accessibility preferences to a first portion of the electronic communication that has been added to the electronic communication prior to adding the new recipient to identify the at least one accessibility violation of the electronic communication.

5. The method of claim 1, wherein, upon identifying the at least one accessibility violation of the electronic communication, waiting to apply the one or more accessibility rules to a remaining portion of the electronic communication until detecting a selection of a selectable option associated with applying the accessibility rules to a remaining portion of the electronic communication.

6. The method of claim 1, wherein the accessibility alert indicator comprises a selectable option to initiate an analysis of the electronic communication, and further comprising:
in response to detecting a selection of the accessibility alert indicator, performing further analysis of the electronic communication to identify one or more additional accessibility violations of the electronic communication.

7. The method of claim 6, wherein applying the accessibility rules to the electronic communication comprises applying the accessibility rules to content from a body of the electronic communication up until identifying the at least one accessibility violation and without applying the accessibility rules to additional portions of the electronic communication prior to detecting the selection of the accessibility alert indicator.

8. The method of claim 1, wherein determining that the at least two recipients of the plurality of recipients have indicated the accessibility preferences comprises:
identifying a first recipient of the plurality of recipients for which no accessibility preference information is available; and
based on an absence of accessibility preference information for the first recipient, associating the first recipient with the accessibility preferences associated with receiving accessible content within electronic communications.

9. The method of claim 1, further comprising:
detecting one or more of:
an attachment of an electronic document to the electronic communication; or
a link to an electronic document within a body of the electronic communication; and
applying the accessibility rules to the electronic document to identify the at least one accessibility violation of the electronic communication.

10. The method of claim 1, wherein providing the accessibility alert indicator comprises one or more of:
providing a visual indicator via a graphical user interface of a client device;
providing an audio indicator via a speaker device in communication with the client device; or
providing a haptic indicator via an input device in communication with the client device.

11. The method of claim 1, further comprising:
receiving accessibility preference information from a communication server; and
storing the accessibility preference information within a contact list on a storage of the client device,
wherein identifying the plurality of recipients of the electronic communication comprises identifying the plurality of recipients from the contact list, and
wherein determining that the at least two recipients have indicated the one or more accessibility preferences is based on accessibility preference information stored on the storage of the client device.

12. A method, comprising:
identifying a plurality of recipients for an electronic communication;
identifying, for the plurality of recipients, accessibility preferences indicated by two or more of the plurality of recipients;
generating, from a collection of accessibility preferences, a subset of accessibility preferences corresponding to a combination of accessibility preferences indicated by the two or more of the plurality of recipients;
determining a set of accessibility rules corresponding to the subset of accessibility preferences;
applying the set of accessibility rules to content of the electronic communication to identify at least one accessibility violation of the electronic communication; and
providing an accessibility alert indicator indicating the at least one accessibility violation via a graphical user interface of a client device.

13. The method of claim 12, wherein generating the subset of accessibility preferences comprises:
identifying a list of all accessibility preferences identified for each recipient from the plurality of recipients; and
merging accessibility preferences from the identified list into the subset of accessibility preferences.

14. The method of claim 12, wherein generating the subset of accessibility preferences comprises:
identifying a first accessibility preference from the collection of accessibility preferences associated with a first recipient from the two or more of the plurality of recipients;
identifying a second accessibility preference from the collection of accessibility preferences associated with a second recipient from the two or more of the plurality of recipients, wherein the second accessibility preference indicates one or more accessibility rules that are inclusive of one or more accessibility rules associated with the first accessibility preference; and
including the second accessibility preference in the subset of accessibility preferences without also including the first accessibility preference in the subset of accessibility preferences.

15. The method of claim 12, wherein applying the set of accessibility rules comprises applying the set of accessibility rules to content of the electronic communication without applying one or more additional accessibility rules corresponding to accessibility preferences from the collection of accessibility preferences that are not included within the subset of accessibility preferences.

16. The method of claim 12, further comprising:
providing, to a communication server, a call for accessibility preference information for the plurality of identified recipients for the electronic communication; and receiving, from the communication server, accessibility preference information including a list of accessibility preferences for the plurality of recipients, wherein generating the subset of accessibility preferences comprises compiling the list of accessibility preferences received from the communication server.

17. A system, comprising:

one or more processors;

a memory in electronic communication with the one or more processors; and instructions stored in the memory, the instructions being executable by the one or more processors to:
- identify a plurality of recipients for an electronic communication;
- identify, for the plurality of recipients, accessibility preferences indicated by two one or more of the plurality of recipients;
- generate, from a collection of accessibility preferences, a subset of accessibility preferences corresponding to a combination of accessibility preferences indicated by the two or more of the plurality of recipients;
- determine a set of accessibility rules corresponding to the subset of accessibility preferences;
- apply, while new content is being added to the electronic communication, the set of accessibility rules to the electronic communication to identify a first accessibility violation of the electronic communication; and
- provide, via a graphical user interface of a client device, an accessibility alert indicator indicating that one or more accessibility violations have been detected.

18. The system of claim 17, wherein applying the set of accessibility rules to the electronic communication comprises applying the set of accessibility rules to a first portion of the electronic communication, and further comprising instructions being executable by the one or more processors to wait to apply the set of accessibility rules to additional portions of the electronic communication until an accessibility command has been selected associated with applying the set of accessibility rules to the additional portions of the electronic communication.

19. The system of claim 17, wherein generating the subset of accessibility preferences comprises:
- identifying a list of all accessibility preferences identified for each recipient of the plurality of recipients; and
- merging accessibility preferences from the identified list into the subset of accessibility preferences.

\* \* \* \* \*